(12) United States Patent
Kokkelink et al.

(10) Patent No.: US 6,529,325 B1
(45) Date of Patent: Mar. 4, 2003

(54) POLARIZATION BASED OPTICAL SPLITTER/COMBINER

(75) Inventors: Jan W. Kokkelink, Blairstown, NJ (US); Talal K. Findakly, Hackettswtown, NJ (US)

(73) Assignee: Micro Optics, Inc., Hackettstown, NJ (US)

( * ) Notice: Subject to any disclaimer, the term of this patent is extended or adjusted under 35 U.S.C. 154(b) by 76 days.

(21) Appl. No.: 09/663,316

(22) Filed: Sep. 15, 2000

Related U.S. Application Data

(60) Provisional application No. 60/154,044, filed on Sep. 16, 1999.

(51) Int. Cl.[7] .............................. G02B 27/28; G02B 5/30
(52) U.S. Cl. ......................................... 359/497; 385/33
(58) Field of Search ................ 385/11, 33, 36, 385/38; 359/495, 496, 497

(56) References Cited

U.S. PATENT DOCUMENTS 5,287,214 A * 2/1994 Robertson et al. .......... 359/260
6,282,025 B1 * 8/2001 Huang et al. ................ 359/495

* cited by examiner

Primary Examiner—Cassandra Spyrou
Assistant Examiner—Alessandro V. Amari
(74) Attorney, Agent, or Firm—Michael W. Ferrell

(57) ABSTRACT

A compact inline fiber optic polarization splitter/combiner for use in fiber optic communications. The splitter/combiner uses two birefringent wedges aligned with their optical axis at 90° from each other and their bases disposed oppositely to each other. One lens is used at the input to couple light from the input fiber. A single output lens is used to couple light into two adjacent polarization maintaining fibers. When used as a combiner a beam of a first linear polarization state from one input fiber is combined with a beam of second linear polarization state from a second input fiber into a third output fiber carrying both beams. The splitter/combiner also provides for the ready alignment of the input and output beams further saving cost and complexity.

16 Claims, 1 Drawing Sheet

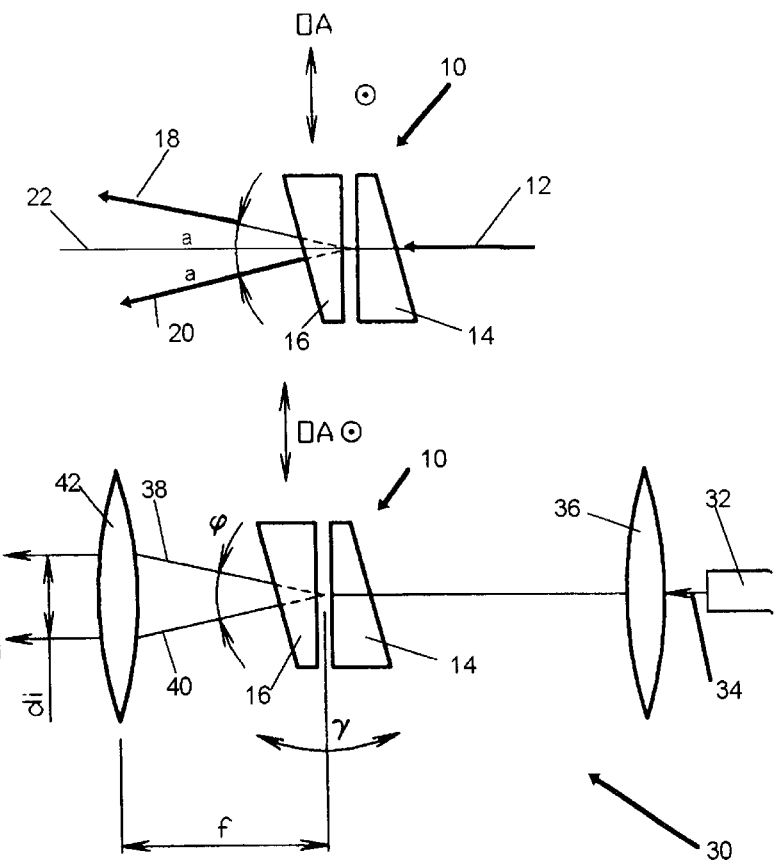
Fig. 1
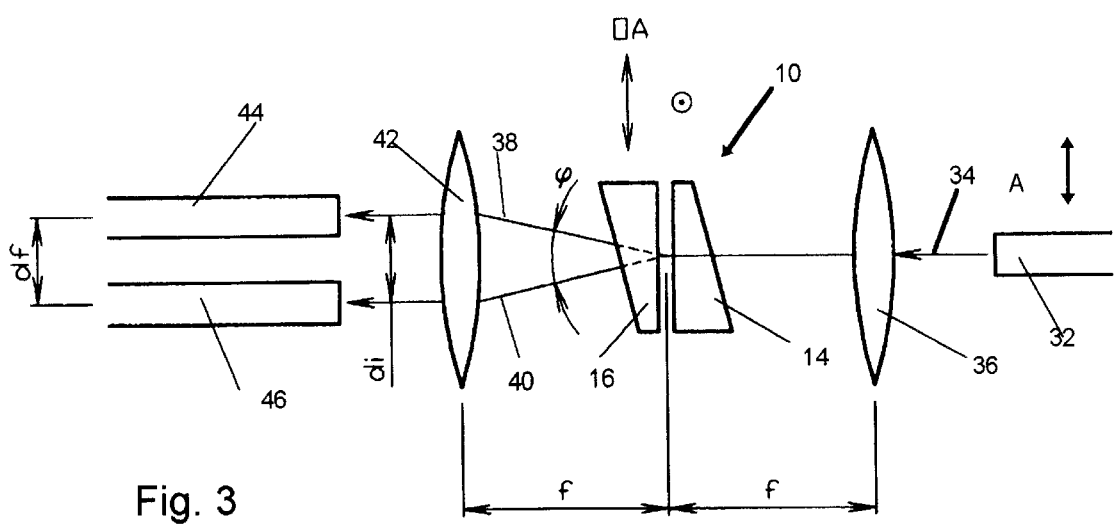
Fig. 2
Fig. 3

POLARIZATION BASED OPTICAL SPLITTER/COMBINER

CROSS REFERENCE TO RELATED APPLICATIONS

This application claims the benefit of the filing date of U.S. provisional patent application Serial No. 60/154,044 filed Sep. 16, 1999.

BACKGROUND AND SUMMARY OF THE INVENTION

The present invention is directed to optical components for use in fiber optic networks and particularly to devices known as optical polarization splitters (dividers) or combiners (multiplexers).

In fiber optical transmission systems the light beams traveling in two fibers must often be combined into a single fiber, a device which accomplishes this is called combiner or multiplexer. Similarly, in such systems one beam must frequently be split into two or more beams, a device which accomplishes this is called a splitter or divider. A splitter or combiner is simply the same device used "in reverse" i.e. when a beam is launched from a single fiber through a splitter/combiner the beam will be split into two beams and directed to two output fibers, if two beams are launched from the previous "output" (now input) fibers back through the splitter/combiner the beams will be combined into a single beams and directed to the single "input" (now output) fiber. However the use of standard splitter/combiners brings with it an important consideration: each splitting or combining of the beam causes a 3 dB loss of light power, as a beam traveling through a fiber optic transmission system may undergo many splittings and combinations the cumulative effect of the 3 dB losses can be very large.

One practicable splitter/combiner which does not incur the 3 dB losses is a so called polarization splitter/combiner in which an incoming beam having two orthogonal linear polarizations is split into two beams by being passed through a displacer or by the use of a polarizing beam splitter (either a prism cube or a thin film on a glass plate) with one beam having a first linear polarization state and the other a second linear polarization state with the first and second polarization states being orthogonal to each other. When used as a combiner a beam of a first linear polarization state from one input fiber is combined with a beam of second linear polarization state from a second input fiber into a third output fiber carrying both beams.

Previous polarization splitter/combiners relying on the use of polarizing beam splitters and birefringent displacers have required three lenses to couple light into the input and output fibers. In addition, in the case of polarizing beam splitter or film, the polarization extinction ratio is limited to 20–30 dB. The present invention is directed to an optical polarization splitter/combiner of the "inline" type which provides a more compact splitter/combiner by displacing the beams in angle instead of position. This has the advantage of using one collimating lens per two input or output fibers with all of the input and output fibers lying parallel to each other. The reduction in component count also greatly simplifies the necessary alignment of the components and thus reduces cost. The present invention also provides for the ready alignment of the components of the splitter/combiner to reduce insertion loss thus further saving cost and complexity.

In the polarization based optical splitter/combiner of this invention, two birefringent wedges are aligned with their optical axes at 90° from each other, with the optical axes perpendicular to the direction of light propagation, and with the base of one wedge disposed upwardly and the base of the other wedge disposed downwardly. When used as a splitter, one lens is used at the input to couple light from the input fiber (thus sending a collimated beam into the two birefringent wedges). The birefringent wedges will split the incoming beam into two component orthogonal polarization states, one beam having an E (extraordinary) polarization state and the other an O (ordinary) polarization state, with respect to the considered birefringent wedge. A single output lens is used to couple the output beams into two adjacent parallel polarization maintaining (PM) or single mode (SM) fibers, the PM fibers can have any optic axis orientation which is convenient. When used as a combiner an E beam from a first fiber is combined with a O beam from a second fiber into an single output beam. The common port fiber (the input fiber in a polarization divider operation or the output fiber in polarization combiner operation) can be a polarization maintaining fiber or a single mode fiber (non-polarization maintaining fiber) depending on the application requirement.

BRIEF DESCRIPTION OF THE DRAWINGS

For a better understanding of the invention, reference is made to the following drawings which are to be taken in conjunction with the detailed description to follow in which:

FIG. 1 illustrates the operation of a birefringent wedge set which forms the beam splitting and beam combining component of the present invention;

FIG. 2 illustrates the components of the optical splitter/combiner of the present invention and the means for adjusting the distance between the output beams (di) such that it equals the fiber separation (df); and FIG. 3 illustrates a further arrangement for adjusting the distance between the output beams (di) of the optical splitter/combiner of the present invention.

DESCRIPTION OF THE PREFERRED EMBODIMENTS

FIG. 1 illustrates the operation of a birefringent wedge set 10 as it acts upon an incoming light beam 12. Birefringent wedge set 10 comprises two birefringent wedges 14, 16 which are aligned with their optical axis at 90° from each other, with their optical axes perpendicular to the direction of light propagation, and with their bases (widest part) disposed opposite each other (i.e. one wedge is inverted with respect to the other). As shown in the drawings the optical axis (OA) of birefringent wedge 16 is illustrated as a vertical arrow with the optical axis of birefringent wedge 14 illustrated as a circled dot representing an arrow extending into and out of the plane of the paper. The actual direction of orientation of the optical axes of birefringent wedges 14, 16 is not critical as long as the optical axes of the two wedges are at 90° from each other. Suitable birefringent materials for wedges 14, 16 include, but are not limited to, lithium niobate ($LiNbO_3$), rutile ($TiO_2$), and yttrium vanadate ($YVO_4$). The above described birefringent wedge set design provides a substantially symmetrical beam splitting (or combining), however it is to be understood that other birefringent wedge designs using one, two, three or more wedges can also be used in this invention.

In the following description the E and O polarization states are described as those states relative to the birefringent wedge which the beam will hit first or has left last. The principle of operation of the device as a polarization splitter is as: in the "forward direction", the first birefringent wedge 14 splits input light beam 12 into two orthogonal states of polarization, called an extraordinary "E" beam 18 and an ordinary "O" beam 20. Because the optical axis of second birefringent wedge 16 is at 90° from the wedge 14, the "E" and "O" polarizations become "O" and "E", (with respect to birefringent wedge 16) as they travel through second birefringent wedge 16 (i.e. they switch their respective input polarization state) and therefore beams 18, 20 exit birefringent wedge 16 in a direction not in parallel with each other but separated by an angle a from the centerline 22 of input beam 12.

FIG. 2 illustrates the components of polarization based optical splitter 30 using birefringent wedge set 10. Splitter 30 includes an input optical fiber 32 which delivers an input beam 34 to an input lens 36 collimating light emitted from fiber 32 and directing it to wedge set 10. Input beam 34 contains light having two orthogonal linear polarizations and as such birefringent wedge set 10 will split beam input beam 34 into E and O component beams 38, 40 which diverge at an angle φ. Lens 42 has its focal point located at the intersection of beams 38 and 40, lens 42 will now focus the light into two adjacent parallel output fibers 44 and 46. Input fiber 32 and output fibers 44, 46 are parallel to each other forming a compact inline design which requires only a single output lens 42. Depending on the requirements of the particular application, output fibers 44, 46 can be of the single mode type (SM) or polarization maintaining type (PM) with the optical axes conveniently aligned. Input fiber 32 can be of either the PM or SM type. Collimating lenses 36, 42 may be of the usual types used in fiber optic systems such as graded index (GRIN) lenses.

Splitter 30 of FIG. 2 may be readily operated as a combiner, in this mode of operation fibers 44, 46; which should be PM fibers (but can be SM fibers), are used as input fibers with lens 42 becoming the input lens and fiber 32 becoming the output fiber with lens 36 now the output lens. The principle of operation of the device as a polarization combiner is as follows: in the "reverse" direction, light from the fibers 44, 46; with fiber 44 carrying light of a first linear polarization state (E or O) and fiber 46 carrying the other state; is collimated by lens 42 and directed towards birefringent wedge set 10. In this case the light path followed will be the exact reverse of that followed with splitter 30. Lens 36 then focuses combined beams into fiber 32.

The light beam carried by the core of most commonly used optical fibers is only on the order of 10 microns in diameter. Accordingly the alignment of the components of a splitter/combiner is critical or excessive insertion loss will result. Excessive insertion loss can be the result of tolerances in the components, such as: wedge angle, lens focal lengths and fiber separation (the distance between the fiber cores on the two fiber side of the device shown as df in FIG. 2). These tolerances can be compensated for by tilting ("tipping") wedges 14, 16 in the plane defined by the angle separated "O" and "E" beams (beams 38 and 40 in FIG. 2) or perpendicular to this plane. This tilting of wedges 14, 16 at an angle φ will have the result of changing the angle p between the "O" and "E" beams and thus the distance between output beams 38, 40 when they impinge upon output fibers 44, 46 therefore compensating for the above mentioned tolerances. Another way of compensating for these tolerances is by using compound collimating lenses, in which the focal length can be varied, this will also have the desired compensating effect.

FIG. 3 illustrates an additional arrangement for adjusting the distance between the output beams components of the optical splitter/combiner of the present invention. In FIG. 3 the same reference numbers are used to designate the same components as FIG. 2, the major difference of the arrangement of FIG. 3 is that both lenses 36 and 42 have their optical focal (f) point located at the intersection of beams 38 and 40. This permits compensation for the spacing (df) between output fibers 44, 46 by displacing input fiber 32 in the plane defined by beams 38 and 40 in FIG. 3. When input fiber 32 is displaced along line A (or perpendicular to line A, i.e. into and out of the paper) the angle φ between output beams will be changed and thus the distance (di) between output beams 38, 40 will also be changed when they impinge upon output fibers 44, 46 therefore compensating for the tolerances, this is similar to the tipping of the wedges mentioned before only now the beam is tipped instead of the wedges. Due to the fact that lenses 36, 42 are at 2f with respect to each other insertion loss is not affected when fiber 32 or fibers 44 and 46 are moved off of the centerline. The splitter arrangement of FIG. 3 may of course be utilized as a combiner in the same manner as that of FIG. 2.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A polarization based optical splitter for splitting an input light beam from an input optical fiber into first and second output beams said first output beam having a linear polarization which is orthogonal to the polarization state of the second output beam and delivering the output beams to first and second output optical fibers, said polarization based optical splitter comprising:

a) a birefringent wedge set having first and second birefringent wedges;

b) an input collimating lens for collimating and directing the light from the input optical fiber onto the birefringent wedge set;

c) said birefringent wedge set splitting said input light beam into first and second output beams, said first output beam having a linear polarization which is orthogonal to the polarization state of the second output beam;

d) an output lens for focusing the first and second output beams onto the first and second output fibers respectively; and e) means for adjusting the angle between the first and second output beams, said angle adjusting means comprising means for tilting the birefringent wedge set in the plane defined by the angle of the first and second output beams.

2. The polarization based optical splitter as claimed in claim 1 wherein the output lens used to focus the first and second output beams into the output fibers has its focal point at the intersection of the output beams.

3. The polarization based optical splitter as claimed in claim 2 wherein the input lens used to focus the input beam has its focal point at the intersection of the output beams.

4. The polarization based optical splitter as claimed in claim 3 wherein the birefringent wedges are selected from the group consisting of lithium niobate ($LiNbO_3$), rutile ($TiO_2$), and yttrium vanadate ($YVO_4$).

5. The polarization based optical splitter as claimed in claim 1 wherein at least one of the input and output lenses comprise graded index lenses.

6. A polarization based optical splitter as claimed in claim 1 wherein said first birefringent wedge has an optical axis orthogonal to the optical axis of the second birefringent wedge, and perpendicular to the light propagation direction, with the bases of the birefringent wedges being oppositely disposed.

7. A polarization based optical combiner for combining first and second input light beams from first and second input fibers into an output beam delivered to an output fiber, the first input beam having a linear polarization state which is orthogonal to the polarization state of the second input beam, said output beam having two orthogonal linear polarizations, said polarization based optical combiner comprising:

a) a birefringent wedge set having first and second birefringent wedges;

b) an input collimating lens for collimating and directing the light from the first and second input beams into the birefringent wedge set;

c) said birefringent wedge set combining said first and second input beams into an output beam having two orthogonal linear polarizations;

d) an output lens for focusing the output beam into the output fiber; and e) means for adjusting the angle between the first and second input beams, said angle adjusting means comprising means for tilting the birefringent wedge set in the plane defined by the angle of the first and second input beams.

8. The polarization based optical combiner as claimed in claim 7 wherein the input lens used to focus the first and second input beams has its focal point at the intersection of the input beams.

9. The polarization based optical combiner as claimed in claim 8 wherein the output lens has its focal point at the intersection of the input beams.

10. The polarization based optical combiner as claimed in claim 7 wherein at least one of the input and output lenses comprise graded index lenses.

11. The polarization based optical combiner as claimed in claim 7 wherein the birefringent wedges are selected from the group consisting of lithium niobate ($LiNbO_3$), rutile ($TiO_2$), and yttrium vanadate ($YVO_4$).

12. The polarization based optical combiner as claimed in claim 7 wherein said first birefringent wedge has an optical axis orthogonal to the optical axis of the second birefringent wedge, and perpendicular to the light propagation direction, with the bases of the birefringent wedges being oppositely disposed.

13. A polarization based optical splitter for splitting an input light beam from an input optical fiber into first and second output beams said first output beam having a linear polarization which is orthogonal to the polarization state of the second output beam and delivering the output beams to first and second output optical fibers, said polarization based optical splitter comprising:

a) a birefringent wedge set having first and second birefringent wedges;

b) an input collimating lens for collimating and directing the light from the input optical fiber onto the birefringent wedge set;

c) said birefringent wedge set splitting said input light beam into first and second output beams, said first output beam having a linear polarization which is orthogonal to the polarization state of the second output beam;

d) an output lens for focusing the first and second output beams onto the first and second output fibers respectively; and e) means for adjusting the angle between the first and second output beams by adjusting the vertical position of the input fiber with respect to the input lens.

14. The polarization based optical splitter as claimed in claim 13 wherein the focal points of the input and output lenses coincide.

15. A polarization based optical combiner for combining first and second input light beams from first and second input fibers into an output beam delivered to an output fiber, the first input beam having a linear polarization state which is orthogonal to the polarization state of the second input beam, said output beam having two orthogonal linear polarizations, said polarization based optical combiner comprising:

a) a birefringent wedge set having first and second birefringent wedges;

b) an input collimating lens for collimating and directing the light from the first and second input beams into the birefringent wedge set;

c) said birefringent wedge set combining said first and second input beams into an output beam having two orthogonal linear polarizations;

d) an output lens for focusing the output beam into the output fiber; and e) means for adjusting the angle between the first and second input beams by adjusting the vertical position of the output fiber with respect to the output lens.

16. The polarization based optical splitter as claimed in claim 15 wherein the focal points of the input and output lenses coincide.

* * * * *

UNITED STATES PATENT AND TRADEMARK OFFICE
CERTIFICATE OF CORRECTION

PATENT NO. : 6,529,325 B1
DATED : March 4, 2003
INVENTOR(S) : Jan W. Kokkelink et al.

It is certified that error appears in the above-identified patent and that said Letters Patent is hereby corrected as shown below:

<u>Title page,</u>
Item [75], please change the city from "Hackettswtown" to -- Hackettstown --

Signed and Sealed this

Fifth Day of August, 2003

JAMES E. ROGAN
*Director of the United States Patent and Trademark Office*